United States Patent
Pearce et al.

(10) Patent No.: US 10,983,901 B1
(45) Date of Patent: Apr. 20, 2021

(54) SYSTEMS AND METHODS FOR FUZZ TESTING SERVERLESS SOFTWARE APPLICATIONS

(71) Applicant: Amazon Technologies, Inc., Seattle, WA (US)

(72) Inventors: Craig Wilfred Pearce, Seattle, WA (US); Bryan Williams, Seattle, WA (US); Khai Tran, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/992,633

(22) Filed: May 30, 2018

(51) Int. Cl.
  *G06F 9/44* (2018.01)
  *G06F 9/445* (2018.01)
  *G06F 11/36* (2006.01)

(52) U.S. Cl.
  CPC ...... *G06F 11/3684* (2013.01); *G06F 11/3612* (2013.01); *G06F 11/3664* (2013.01); *G06F 11/3688* (2013.01)

(58) Field of Classification Search
  CPC .......... G06F 11/3684; G06F 11/3612; G06F 11/3664; G06F 11/3688
  See application file for complete search history.

(56) References Cited

U.S. PATENT DOCUMENTS

| | | | | |
|---|---|---|---|---|
| 9,104,877 B1 * | 8/2015 | Allen | ................ | G06F 11/3476 |
| 9,146,829 B1 * | 9/2015 | Allen | ................ | G06F 11/3668 |
| 10,248,522 B1 * | 4/2019 | Cain | ................ | G06F 11/2273 |
| 2008/0301813 A1 * | 12/2008 | Neystadt | ............ | G06F 11/3672 726/25 |
| 2012/0117544 A1 * | 5/2012 | Kakulamarri | ....... | G06F 11/3612 717/126 |
| 2014/0047275 A1 * | 2/2014 | Eddington | .......... | G06F 11/0766 714/37 |

(Continued)

OTHER PUBLICATIONS

Ella Bounimova, Billions and Billions of Constraints: Whitebox Fuzz Testing in Production, 2013, pp. 1-14. https://ieeexplore.ieee.org/stamp/stamp.jsp?tp=&arnumber=6606558 (Year: 2013).*

(Continued)

*Primary Examiner* — Mongbao Nguyen
(74) *Attorney, Agent, or Firm* — Nicholson De Vos Webster & Elliott LLP

(57) ABSTRACT

Techniques are described for "fuzz testing" serverless software applications (for example, software applications implemented by a serverless compute service provided by a service provider network). Fuzz testing is an automated testing technique involving a fuzzer client application (or simply "fuzzer") providing invalid, unexpected, or random data as inputs to a software application that is the target of the testing to discover software bugs and other runtime issues during execution of the software. To fuzz test a serverless application, a fuzzer continuously sends inputs to the serverless application and, when a runtime error is detected (for example, by monitoring log data generated by the serverless application), a copy of the serverless application can be invoked with the suspected error-inducing input to verify that the input indeed causes the error without interrupting the fuzzer's testing of the original serverless application.

20 Claims, 7 Drawing Sheets

(56) References Cited

U.S. PATENT DOCUMENTS

| | | | | |
|---|---|---|---|---|
| 2015/0339217 | A1* | 11/2015 | Avgerinos | G06F 11/3688 |
| | | | | 717/132 |
| 2016/0350211 | A1* | 12/2016 | Cecchetti | G06F 11/3668 |
| 2017/0270033 | A1* | 9/2017 | Aoki | G06F 21/577 |
| 2017/0286279 | A1* | 10/2017 | Allison | G06F 11/3688 |
| 2018/0300197 | A1* | 10/2018 | Marron | G06F 11/0778 |
| 2018/0329788 | A1* | 11/2018 | Blum | G06F 9/45558 |
| 2018/0365139 | A1* | 12/2018 | Rajpal | G06F 21/577 |
| 2019/0114436 | A1* | 4/2019 | Kim | G06F 11/28 |
| 2019/0129773 | A1* | 5/2019 | Suter | G06F 11/3688 |
| 2019/0146900 | A1* | 5/2019 | Rose | G06F 11/3668 |
| | | | | 717/124 |
| 2019/0171552 | A1* | 6/2019 | Mitchell | G06F 11/3672 |
| 2019/0312899 | A1* | 10/2019 | Shulman | H04L 63/1425 |
| 2019/0361789 | A1* | 11/2019 | Phan | G06F 11/3604 |

OTHER PUBLICATIONS

Wen Xu, Designing New Operating Primitives to Improve Fuzzing Performance, 2017, pp. 1-16.*

Scott Michael Seal, Optimizing Web Application Fuzzing With Genetic Algorithms and Language Theory, 2016, pp. 1-79 https://pdfs.semanticscholar.org/c1c9/977b8bf75decbe959e8aac9bdcc9146e92e8.pdf (Year: 2016).*

Ivan Andrianto, Web Application Fuzz Testing, 2017, pp. 1-6. https://ieeexplore.ieee.org/stamp/stamp.jsp?tp=&arnumber=8285893 (Year: 2017).*

Nikolas Havrikov, Efficient Fuzz Testing Leveraging Input, code, and execution, 2017, pp. 417-420. https://ieeexplore.ieee.org/document/7965373 (Year: 2017).*

* cited by examiner

SYSTEMS AND METHODS FOR FUZZ TESTING SERVERLESS SOFTWARE APPLICATIONS

BACKGROUND

Many companies and other organizations operate computer networks that interconnect numerous computing systems to support their operations. For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Figure 1:
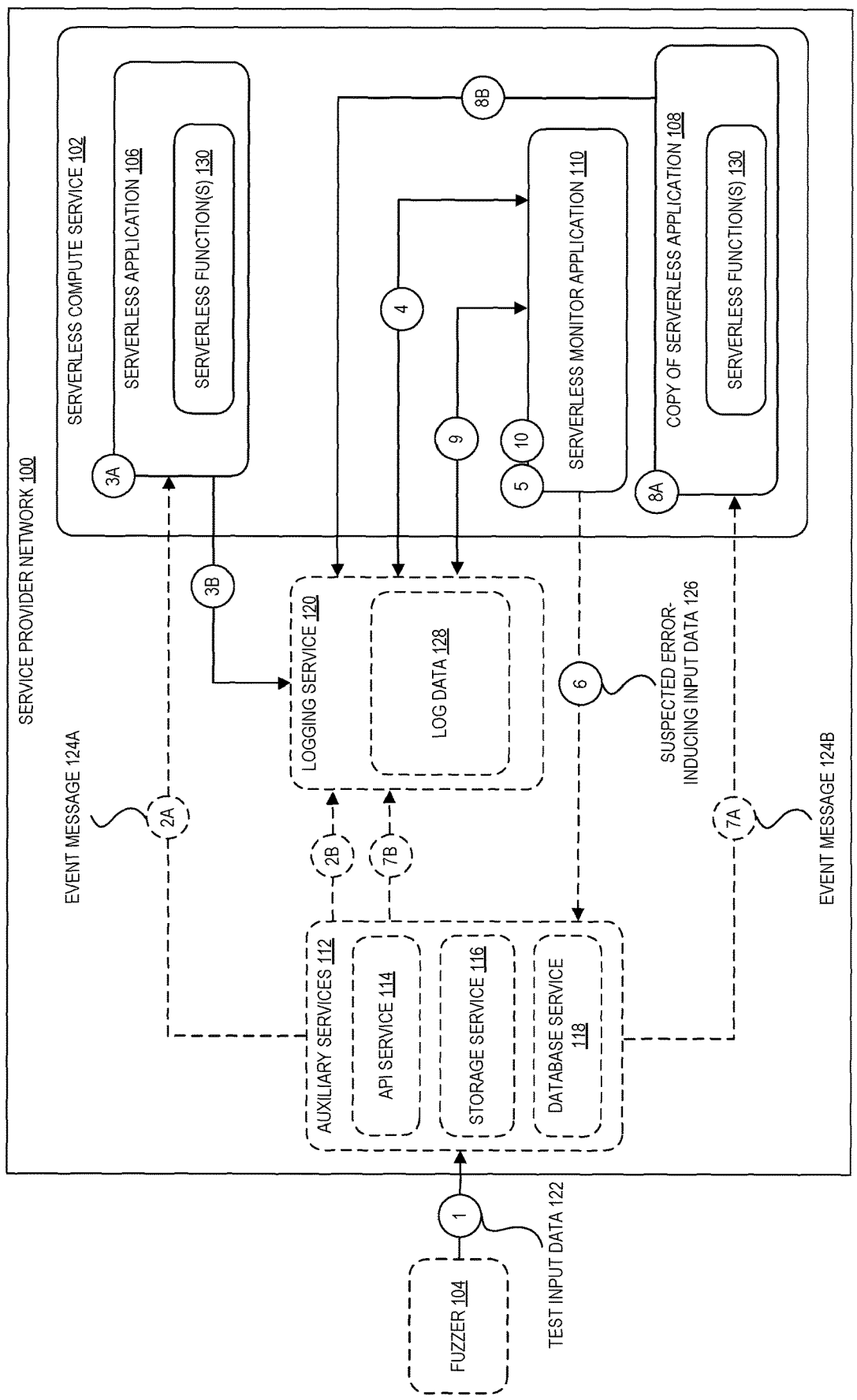
FIG. 1 is a diagram illustrating an environment for fuzz testing serverless software applications according to some embodiments.

Various embodiments of methods, apparatus, systems, and non-transitory computer-readable storage media are described for "fuzz" testing serverless software applications implemented by a serverless compute service of a service provider network. As used herein, fuzz testing refers to a variety of automated software testing techniques that generally involve a fuzz testing client application (or simply "fuzzer") providing invalid, unexpected, or random data as inputs to a target software application to test the application for runtime errors indicative of software bugs or other issues. Conventional fuzzers are typically designed to test software applications installed on a server or other persistent computing device and often work in conjunction with a monitoring application that executes alongside the target software application to monitor the application for crashes and other runtime errors during testing. Typically, such conventional fuzzers continuously provide test inputs to a target software application until the monitoring application detects a crash or other type of runtime error. When an error is detected, the monitoring application instructs the fuzzer to stop sending additional inputs, and the fuzzer then attempts to replay inputs generated around the time the runtime error occurred to identify the specific input causing the error. Once identified, the error-inducing input and source code of the software application can be analyzed by developers or other users to evaluate why the input caused the error and how to remediate the issue.

The type of fuzz testing described above typically occurs in the context of traditional software applications that are installed and persist on user-managed computing devices such as desktop computers, servers, and the like. According to embodiments described herein, a serverless compute service of a service provider network enables users to create and use serverless software applications that differ in many ways from traditional software applications. For example, in contrast to processes for developing and executing traditional software applications, a serverless compute service enables users to provide source code to a service provider network for on-demand execution of the code without the users needing to provision or manage the computing resources—servers, memory, operating systems, runtime environments, and so forth—used to execute the source code. Source code provided to a serverless compute service can be caused to execute, or be "invoked," in a number of ways including, for example, using a console interface to request invocation of the source code, in response to an event message generated by another application or service of the service provider network, or in response to an application programming interface (API) request from an application internal or external to the service provider network. The use of such serverless compute services can alleviate many issues involved in developing, administering, and scaling traditional software applications, among other benefits.

Like developers of traditional software applications, however, developers of serverless software applications often desire to test serverless applications for software bugs and other issues, and may at times desire to use fuzz testing to perform such testing. Embodiments of a system for fuzz testing such serverless applications are described herein. In one embodiment, a system for fuzz testing serverless applications includes a fuzzer that generates program inputs used to test a serverless application, where some or all of the generated program inputs causes a separate instance of the serverless application to be executed. The program inputs generated by a serverless application fuzzer can be randomly generated, generated based on an API specification, protocol, or file format associated with the serverless application being tested, generated based on various known data types supported by the serverless application, or based on any other input formats or combinations thereof. For example, if a serverless application accepts integer inputs, a fuzzer used to test the application might generate various test integer inputs to send to the application including, for example, various very large numbers, the value zero, negative numbers, other random numbers, as well as various types of non-integer inputs, each used to test whether the application experiences any runtime errors or otherwise handles any of the inputs in an unexpected manner.

Depending on the nature of a serverless application being tested, a serverless application can be invoked based on each of the fuzzer-generated program inputs in a variety of ways including, but not limited to, by directly invoking the serverless application with the inputs via an interface of the serverless compute service, by sending requests based on the program inputs using an API that causes invocation of the serverless application, by interacting with a separate service of the service provider network (for example, an API gateway service, a storage service, a database service, and so forth) in ways that cause invocation of the serverless application, and so forth. In an embodiment, the serverless compute service executes the serverless application in response to each invocation of the application by the fuzzer and, during execution, the serverless application may perform various operations based on the input it receives.

In some embodiments, a serverless application generates log data during executions invoked based on the fuzzer-generated input data. The log data can include any information related to the application's execution such as debugging information, information related to runtime events, program warnings, information describing runtime errors, and so forth. In some embodiments, a logging service of the service provider network is used to collect, store, and optionally monitor log data generated by a serverless application undergoing testing for indications of runtime errors or other unexpected conditions.

In an embodiment, a monitor application, which can be implemented as a separate serverless application or other type of application, is used to determine whether runtime errors occur during the fuzz testing of a serverless application. For example, a monitor application may determine that a runtime error occurred during execution of a serverless application by analyzing the log data generated by the serverless application, in response to receiving an event message from the logging service indicating the presence of log data indicating a runtime error, by monitoring the operation of the serverless application directly, or using any other techniques for detecting runtime errors.

In an embodiment, in response to determining that a runtime error has occurred during testing of the serverless application, the serverless monitor application identifies one or more program inputs generated by the fuzzer that are suspected to have caused the identified runtime error to occur. The serverless monitor application can identify program input suspected to have caused an identified runtime error in a number of ways such as, for example, by identifying the program input in the log data generated by the serverless application (if the serverless application includes the program inputs it receives in the log data it generates), by correlating log data generated by the serverless application with other log data generated by the fuzzer or other services involved in invoking the serverless application, by correlating timestamps associated with log data generated by the serverless application, fuzzer, or other services, and so forth.

In an embodiment, in response to identifying program input suspected to have caused the runtime error, the serverless monitor application uses the same program input to invoke of a copy of the serverless application being tested. For example, the copy of the target serverless application may be implemented based on the same source code, or a modified version thereof, as that used to implement the original serverless application. In general, the copy of the serverless application can be used to verify whether program input suspected to have caused the identified runtime error indeed causes the error to occur during execution of the serverless application. In some embodiments, causing execution of a copy of the target serverless application can also include sending the input to other services involved in invoking of the original serverless application (for example, to copies of APIs of an API service, copies of databases of a database service, and so forth).

Among other benefits, using a copy of a serverless application to verify whether suspected error-inducing program inputs indeed cause an error enables a serverless application fuzzer to continue testing the original serverless application without interruption. For example, because suspected error-inducing program inputs are tested against a separate copy of the serverless application being tested, the fuzzer can continue testing additional program inputs against the original serverless application without stopping to replay suspected error-inducing program inputs that it previously sent. Furthermore, a monitor application that runs independently of the serverless application undergoing testing enables such testing to be performed against serverless applications which may not persist on any one computing device across separate invocations of the applications.

In some embodiments, once a monitor application verifies that a program input indeed causes a runtime error during execution of the copy of the serverless application, the program input can be stored in a data store used to collect error-inducing inputs for analysis, to generate alerts or notifications, or for any other purposes. In one embodiment, information about the program input can be sent to an inspection engine that uses machine learning (ML) and other techniques to collect, classify, and analyze program inputs known to cause errors. For example, error-inducing program inputs can be classified based on properties of the program inputs (data types, input sizes, and so forth), how the program inputs are used to invoke serverless applications (for example, as direct input, as part of an API request, or as input to a separate service), based on properties of the target serverless application (for example, programming languages used, types of operations being performed when the error occurred, structure of the code raising the error), and so forth. This information can be used to generate additional test program inputs based on inputs known to frequently cause errors, to recommend code patches and other types of remediation known to correct commonly occurring issues, among other possible uses.

FIG. 1 is a block diagram illustrating an environment for fuzz testing serverless software applications. In some embodiments, a serverless compute service 102, a logging service 120, and other auxiliary service(s) 112 operate as part of a service provider network 100 and each comprises one or more software modules executed by one or more electronic devices at one or more data centers and geographic locations. A user using one or more electronic device(s) (which may be part of or separate from the service provider network 100) can interact with the serverless compute service 102 and other services of the service provider network 100 via one or more networks, such as the internet. In an embodiment, a fuzz testing client application (for example, a fuzzer 104) performs operations to fuzz test serverless software applications implemented by a serverless compute service 102 according to embodiments described herein.

A provider network 100 provides users with the ability to utilize one or more of a variety of types of computing-related resources such as compute resources (for example, executing virtual machine (VM) instances and/or containers, executing batch jobs, executing code without provisioning servers), data/storage resources (for example, object storage, block-level storage, data archival storage), network-related resources (for example, configuring virtual networks including groups of compute resources, content delivery networks (CDNs), Domain Name Service (DNS)), application resources (for example, databases, application build/deployment services), etc. These and other computing resources may be provided as services, such as a hardware virtualization service that can execute compute instances, a storage virtualization service that can store data objects, etc. The users (or "customers") of provider networks 100 may utilize one or more user accounts that are associated with a customer account, though these terms may be used somewhat interchangeably depend ending upon the context of use. Users may interact with a provider network 100 across one or more intermediate networks (for example, the internet) via one or more interface(s), such as through use of application programming interface (API) calls, via a console implemented as a website or application, etc. The interface(s) may be part of, or serve as a front-end to, a control plane of the service provider network 100 that includes "backend" services supporting and enabling the services that may be more directly offered to customers.

To provide these and other computing resource services, service provider networks 100 often rely upon virtualization techniques. For example, virtualization technologies may be used to provide users the ability to control or utilize compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the service provider network to perform a variety of computing tasks, or may indirectly utilize a compute instance by submitting code to be executed by the service provider network, which in turn utilizes a compute instance to execute the code (typically without the user having any control of or knowledge of the underlying compute instance(s) involved).

As indicated above, in recent years, organizations have begun to realize the benefits of moving their computing resources—for example, servers, data storage, networks, and applications—out of their existing on-premises data centers and into systems managed by third-party service providers. These service providers typically provide a wide variety of configurable computing resources that can be provisioned and accessed over the internet, often using a "pay-as-you-go" or similar payment model. The ability to readily obtain such computing resources from these service providers eases many of the burdens organizations face in managing on-premises data centers which tend to be expensive to maintain and frequently encounter scalability and resiliency issues.

A common type of computing resource offered by these types of service providers is compute capacity, which is typically purchased by customers in the form of virtual computing resources, or virtual machine (VM) instances. These VM instances, which are hosted by a service provider on physical computing devices with their own operating systems and other software components, can be used in much the same manner as physical computers. As one example use of such compute capacity, computer programmers can use VM instances provisioned at a service provider network to host developed software applications, such as web or mobile applications.

Today, the development of computer software still largely occurs in the context of server-based execution environments such as those described above. For example, if a software developer creates a software application, the developer writes the source code and may often be responsible for building and deploying the code for execution on one or more computing devices managed by the software developer (for example, either computing devices managed in a local computing environment or computing devices at a service provider network provisioned and managed by the user). As the size and complexity of a software application grows, the developer or other IT support may be responsible for provisioning, managing, and scaling an increasing number of servers used to support the program's execution.

Even when VM instances provided by a service provider network are used to alleviate some of a user's server management burdens, developers typically must still decide how many and what type of VM instances to purchase, and how long to keep the VM instances in operation. For example, the costs of using the VM instances provided by service providers may vary depending on the type of instances and amount of time the instances are used. Developers or other IT support typically must also specify the hardware and software resources (for example, types of operating systems and language runtimes, and so forth) used to support the VMs. Other concerns include over-utilization (that is, acquiring insufficient computing resources resulting in potential performance issues), under-utilization (that is, acquiring more computing resources than necessary and thus overpaying for the resources), and resource scaling as application performance demands change over time.

To simplify aspects of the software development process, some service providers today provide so-called "serverless" code execution environments offered as a serverless compute service (for example, a serverless compute service 102 in FIG. 1). In the present disclosure, a serverless compute service refers generally to a service that can automatically provision and manage computing resources used to execute program code on behalf of a user, thereby enabling software developers to build and execute software applications without needing to be aware of the computing resources used to execute the developer's underlying source code. Using a serverless compute service, for example, software developers can focus on the operation of code instead of provisioning and managing computing resources used to run the code.

As indicated above, a serverless compute service 102 hosts source code to be executed without the need for developers of the source code to separately provision or manage the computing resources used to execute the source code. A unit of source code configured to run within a serverless compute service 102 is referred to herein as a serverless function (for example, serverless function(s) 130). In some embodiments, a serverless function 130 includes source code defining logic to execute when the function is invoked and, optionally, includes additional metadata and resource parameters. The associated metadata, for example, may include descriptive information such as a name of the function, a description of the function's intended purpose, and so forth. Resource parameters can include other information related to the execution of the associated function such as, for example, an identifier of a runtime environment used to execute the function (for example, "java8," "nodejs," "python3.6," or any other supported runtime environment), an amount of memory to allocate when executing the function, user roles or permissions to assign to the function, a function execution timeout, and so forth. In an embodiment, a serverless application 106 can comprise a single serverless function 130 or two or more related serverless functions 130.

In some embodiments, a serverless function 130 (and by extension a serverless application 106) is configured to execute in response to events (for example, event messages generated by one or more auxiliary services 112 or a logging service 120, events generated by another serverless function, events generated by an application external to the service provider network 100, or any other event-generating source). A serverless function 130 can perform virtually any processing actions depending on the source code implementing the function and input received by the function. For example, a serverless function 130 can be designed to retrieve and transform data (for example, data received as input, data stored by a storage service 116 or elsewhere), to process API calls made initially to one or more auxiliary services 112, or to perform any other processing tasks. In an embodiment, a serverless compute service 102 provides interfaces (for example, web-based interfaces or console interfaces) that enable users or other processes to upload and configure source code to be executed by the serverless compute service 102, to configure metadata and resource parameters associated with serverless functions, to configure serverless functions to listen for particular types of events that cause invocation of the functions, and so forth.

As indicated above, a serverless compute service 102 can communicate with other components such as, for example, electronic device(s) internal or external to the service provider network 100 and with other auxiliary services (which may include, for example, an API gateway service 114, a storage service 116, a logging service 120, a hardware virtualization service, and so forth). In some embodiments, one or more of the auxiliary services 112 or other system components may be configured to generate event messages for processing by the serverless compute service 102. Thus, for example, an application running on an electronic device (for example, a fuzzer 104) or an auxiliary service 112 of the service provider network 100 may be able to trigger the execution of serverless compute service functions by the serverless compute service 102 in response to events as they occur at the electronic device or service (for example, in response to test input data 122 generated by a fuzzer 104 or in response to an action occurring at an auxiliary service 112).

In one embodiment, a fuzzer 104 or one or more of the auxiliary services 112 may be registered or configured to be polled or queried for events to trigger the execution of serverless functions at the serverless compute service 102. Such registration or configuration may be provided via interfaces provided to user electronic devices. For example, a user interface may provide options for a user to select a fuzzer 104, an auxiliary service 112, or other component as a triggering service such that events occurring at the triggering service trigger generation of event messages, or such that the event triggering service is periodically polled or queried for events (for example, by an intermediary polling system).

In one embodiment, an event triggering service is configured to associate an event or event type with one or more serverless functions 130 to be executed by the serverless compute service 102 (that is, the event triggering service may store or have access to data which associates the event with particular serverless function(s) 130). In another embodiment, the triggering service may not necessarily associate an event or event type with a particular serverless function 130 to be executed by the serverless compute service 102 but rather the event triggering service may generate event messages which the serverless compute service 102 is configured to interpret as being associated with the serverless function to be executed by the serverless compute service 102 (that is, the serverless compute service 102 may store or have access to data which associates the event with the particular serverless function). In another embodiment, an intermediary system or service is configured to handle interpretation and routing of event messages to execute the serverless functions 130, such that neither the event generating service nor the serverless compute service 102 stores or has access to the event-to-serverless function association data. For example, an event-generating service or external application can generate event messages that are agnostic to any particular serverless function 130 to be executed and the event messages can be routed to the serverless compute service 102 (or an intermediary system) which evaluates the event message and associated metadata to determine which serverless function 130 to execute in response and initiates a corresponding request to execute the serverless function 130.

As indicated above, any of the fuzzer 104, auxiliary services 112, other service provider network 100 services, or other applications can be configured to operate as an event-generating service. These can include, but are not limited to, storage services (for example, storage service 116), database services (for example, database service 118), message queue systems (for example, a message queue service provided by the serverless compute service 102, a message queue service provided by the service provider network 100, and so forth), logging services (for example, logging service 120), compute resource management services, and so forth.

As further indicated above, users can use the serverless compute service 102 to execute source code. For example, a user may desire to run source code in the connection with a web application, server application, mobile application, or any other type of application that the user is developing. One way of running the source code is to acquire VM instances from a hardware virtualization service of a service provider network 100, configure the VM instances to suit the user's needs, and use the configured VM instances to run the source code. Alternatively, the user may use the serverless compute service 102 to execute the source code. The serverless compute service 102 can handle the acquisition and configuration of compute capacity (for example, containers, VM instances, and so forth) when execution of the source code is requested and execute the source code using the acquired compute capacity. The serverless compute service 102 can automatically scale up and down based on the volume of execution requests, thereby relieving the user from the burden of worrying about over-utilization or under-utilization of the associated computing resources. In various embodiments, a serverless compute service 102 supports the execution of source code written in one or more general-purpose programming languages (for example, Java, Python, C#, and so forth) and may optionally support other domain-specific programming languages (possibly including, for example, a programming language specific to the serverless compute service 102).

In an embodiment, a serverless compute service 102 includes an interface that receives and processes requests (sometimes in the form of event messages, as described above) to execute serverless functions at the serverless compute service 102. In one embodiment, the interface acts as an interface to a fuzzer 104 or auxiliary services 112 and to other requests to execute source code (for example, based on requests to execute serverless compute service functions 130 sent from an application executing internally or externally to the service provider network 100).

As indicated above, developers of serverless applications may often desire to test serverless applications for runtime errors indicative of software bugs or other unexpected conditions in the source code implementing the serverless application. According to embodiments described herein, fuzz testing a serverless application implemented by a serverless compute service 102 includes a fuzzer 104 generating test input data used to invoke a serverless application that is the target of the testing. For example, at the circle labeled "1" in FIG. 1, a fuzzer 104 generates test input data 122 used to test a serverless application 106 implemented by serverless function(s) 130, where execution of the serverless application 106 is managed by a serverless compute service 102.

In some examples, a fuzzer 104 is an application that is managed separately from the service provider network 100 while, in other examples, a fuzzer 104 can be an application provided by the service provider network 100 or that is part of a service provided by the service provider network 100. In an embodiment, the test input data 122 can include virtually any type of data that can be used as input to a serverless application 106. For example, the test input data might include random data values, structured inputs such as files, sequences of keyboard or mouse movements, messages, API requests, network packets, and so forth. In some embodiments, a user responsible for testing the serverless application 106 configures the fuzzer 104 to generate one or more particular types of test inputs based on types of inputs accepted and capable of being processed by the serverless application 106. For example, assuming the serverless application 106 accepts command-line interface (CLI) inputs, the user can generate one or more CLI scripts that automate the creation of test inputs or provide a format for the creation of randomized test inputs.

In other examples, a fuzzer 104 infers the types of inputs accepted by a serverless application 106 (for example, by sending a variety of input types and monitoring how the application responds) or generates the types of inputs randomly and possibly without any awareness of types of program inputs accepted by the serverless application 106. In one embodiment, a fuzzer 104 can infer types of inputs accepted by a serverless application 106 based on an API specification (for example, a Swagger® specification) or other specification of types of input accepted by the application. A fuzzer 104 can generate the substance of test input data 122 entirely randomly, based on existing or "seed" inputs, or based on any other characteristics of the input structure or program structure associated with serverless application 106. Depending on the nature of the serverless application 106, a fuzzer 104 may directly invoke the serverless application 106 with the generated inputs or, as shown in the example of FIG. 1, the fuzzer 104 may use the inputs as part of requests to a separate application or service (for example, one or more of auxiliary services 112) that indirectly causes invocation of the serverless application 106 based on the test input data 122.

In an embodiment, in examples where an auxiliary service 112 receives a request based on the test input data 122, the auxiliary service processes the request and, optionally, generates one or more event messages and log data as part of processing the request. For example, in FIG. 1, assuming the test input data 122 is included in API requests used to interface with the serverless application 106, an API gateway service 114 initially may receive test input data 122 generated by the fuzzer 104. In this example, at circle "2A," the API gateway service 114 generates an event message 124A in response to receiving one of the fuzzer-generated API requests and, at circle "2B," optionally generates log data that is collected by a logging service 120. The API gateway service 114 may generate the event message 124A, for example, because the API gateway service 114 has been configured to invoke serverless application 106 in response to receiving such API requests. In an embodiment, the log data generated by the API gateway service 114 can include information about the request received from the fuzzer 104 including, for example, an identifier of the request method, various parameters and a payload associated with the request (possibly including the test input data generated by the fuzzer 104), a time the request was received, and so forth. As another example, a storage service 116 may receive test input data 122 in the form of requests to store files at specified storage locations of the storage service 116 and, in response to receiving a request, the storage service 116 generates an event message 124A and creates log data indicating information about the request, the specified file, and so forth.

In an embodiment, at circle "3A," an event message 124A generated by an auxiliary service 112 causes invocation of one or more serverless function(s) 130 comprising a serverless application 106. As indicated above, an invocation of a serverless function 130 causes the serverless compute service 102 to execute the logic implemented by the function(s). In general, execution of the serverless function(s) 130 includes processing input received by the functions based on the test input data 122 generated by the fuzzer 104 either directly or indirectly, as described above. In an embodiment, at circle "3B," one or more of the serverless function(s) 130 generates log data that is collected and stored by the logging service 120 as log data 128. In other examples, log data generated by a serverless application 106 may be stored in other locations or sent directly to a serverless monitor application 110. In an embodiment, log data generated by the serverless function(s) 130 can include any information collected during execution of the serverless functions, including program tracing, debugging information, runtime event information, warnings, indications of runtime errors, and so forth. The log data generated by the serverless functions 130 can be generated by code that is part of the serverless functions, by application software that is separate from the serverless functions and that monitors the serverless application 106, or any combinations thereof.

In an embodiment, at circle "4," a serverless monitor application 110 determines, based on log data generated by the serverless application 106 or using other application monitoring processes, that a runtime error occurred during execution of the serverless application 106 based on program input generated by the fuzzer 104. In the example of FIG. 1, the serverless monitor application 110 is a separate serverless application that monitors for occurrences of runtime errors; in other embodiments, the serverless monitor application 110 may be a part of the serverless application 106, a separate application implemented outside of the serverless compute service 102, a component of the logging service 120, or implemented by other system components. In one example, the serverless monitor application 110 continuously or periodically analyzes log data 128 generated by the serverless application 106 during execution and collected at the logging service 120 (for example, by sending requests to the logging service 120 for log data associated with the serverless application 106). In other examples, a logging service 120 may be configured with one or more rules that are used to analyze log data 128 generated by the serverless application 106 for log data entries indicating runtime errors and, in response to identifying such log data, the rules cause the logging service 120 to generate an event message or other notification that is obtained by the serverless monitor application 110. In yet other examples, a serverless monitor application 110 monitors the serverless application 106 directly for occurrences of runtime errors, for example, by monitoring execution times, resource usage, outputs, or any other information that can be used to detect anomalous behavior.

In an embodiment, in response to determining that a runtime error occurred during execution of the serverless application 106 based on the log data 128, at circle "5," the serverless monitor application 110 identifies one or more program inputs suspected to have caused the runtime error to occur. In some examples, identifying program input suspected to have caused the runtime error can include identifying the program input in the log data 128 indicating the runtime error, assuming the log data generated by the serverless application 106 includes the program inputs it receives. In other examples, the serverless monitor application 110 identifies the program input by correlating log data 128 generated by the serverless application 106 with logs or other data generated by the fuzzer 104, auxiliary services 112, or other system components or combinations thereof. In some embodiments, a fuzzer 104 may annotate or tag test input data 122 that it generates with information that enables the serverless monitor application 110 to correlate log data indicating runtime errors back to the test input data that caused the errors. For example, log data 128 generated by a serverless application 106 indicating an occurrence of a runtime error may include the annotations or tags, or various other identifiers, timestamps, or other information that can be correlated with log data generated by a fuzzer 104 or auxiliary services 112 associated with each generated test input data item. In the example of using timestamps to identify the input data, a timestamp associated with log data 128 indicating an occurrence of a runtime error may be used to identify a time window of test input data 122 (for example, a one-minute range of test input data as recorded by the fuzzer 104) that can be used to identify a set of suspected error-inducing inputs. As described below, each of the inputs in the identified set can be tested individually to verify which of the inputs actually causes the identified error, and the time window of test input data can be expanded if the error is not replicated with any of the inputs in the original set.

In an embodiment, to verify that input data suspected to have caused an identified runtime error indeed causes the runtime error to occur during execution of the serverless application 106, the serverless monitor application 110 invokes a copy of the serverless application 106 using the same input data. In one embodiment, a copy of the serverless application 106 may be created when the fuzz testing is initiated using, for example, a resource provisioning service that can replicate the setup and functionality of the original serverless application 106. In other examples, a copy of the serverless application 106 can be created dynamically each time the serverless monitor application 110 attempts to verify suspected error-inducing input. In some embodiments, the copy of the serverless application 108 may be an exact copy, or "clone," of the serverless application 106 (that is, including an exact copy of the source code, serverless function(s), and any ancillary processes comprising the serverless application 106) or some variation of the serverless application 106 (for example, with additional logging functionality included in the source code or other modifications). As described below in reference to FIG. 3, multiple copies and variations of the serverless application 106 may be used to verify suspected error-inducing input data in some embodiments.

In the example of FIG. 1, assuming the original test input data 122 was used by the fuzzer 104 as part of a request to one of the auxiliary services 112 (for example, as part of an API request sent to an API gateway service 114), at circle "6," the serverless monitor application 110 generates a same or similar request including the suspected runtime error-inducing input data 126 and sends the request to auxiliary services 112. The request may be sent to the same resource implemented by the auxiliary service 112 as that receiving the test input data 122 from the fuzzer 104 initially, sent to a copy of the original resource, or to a variation of the resource initially receiving the test input data 122. In other examples where the serverless application 106 is invoked directly using the test input data 122, the serverless monitor application 110 similarly can instead directly invoke the copy of the serverless application 108 using the suspected error-inducing input data 126.

In an embodiment, an auxiliary service 112 receiving a request based on the suspected runtime error-inducing input data 126 processes the input data and, optionally, generates various event messages and log data. For example, assuming the suspected error-inducing input data 126 is sent as part of an API request, an API gateway service 114 receives the request and, at circle "7A," generates an event message 124B and, at circle "7B," optionally generates log data that is collected by a logging service 120. In an embodiment, the API gateway service 114 (or other auxiliary service 112) may generate the event message 124B, for example, because the API gateway service 114 or serverless compute service 102 has been configured to invoke an instance of the copy of the serverless application 108 in response to such requests. Similar to the generation of log data at circle "2B," in an embodiment, the log data generated by an auxiliary service 112 can include information about the request parameters and payloads, a time the request was received, among other possible information.

In an embodiment, at circle "8A," a copy of the serverless application 108 is invoked based on the event message 124B and, at circle "8B," the application 108 generates log data during execution that is collected by the logging service 120. Similar to the generation of log data by the serverless application 106, the log data generated by the copy of the serverless application 108 can include program tracing, debugging information, runtime event information, warnings, indications of runtime errors, and so forth.

In an embodiment, at circle "9," a serverless monitor application 110 determines, based on the log data generated by the copy of the serverless application 108, that a runtime error occurred during execution of the application 108 based on the suspected error-inducing program input 126. For example, the serverless monitor application 110 may analyze the log data 128 generated by the copy of the serverless application 108, or the logging service 120 may be configured with one or more rules that are used to analyze log data 128 for log data entries indicating that the runtime error occurred. In an embodiment, the serverless monitor application 110 can verify that the identified runtime error corresponds to the same error that was identified during execution of the original serverless application 106. In this manner, the serverless monitor application 110 can confirm that the suspected error-inducing program input 126 indeed causes the runtime error initially identified by the serverless monitor application 110.

In an embodiment, at circle "10," the serverless monitor application 110 performs one or more operations in response to verifying that the suspected error-inducing input data causes the error to occur during execution of the serverless application 106. For example, the serverless monitor application 110 may perform operations including one or more of: storing the input data in a data store, generating an alert or other type of event message identifying the input data, causing display of one or more graphical elements of a graphical user interface (GUI) identifying the input data, sending the input to an inspection engine for classification and other analysis, and so forth. In one embodiment, the input is presented to a user in a GUI or other interface that enables the user to resend the input to the serverless application 106, or to send a modified version of the input, to help the user manually test the application and to remediate the issue in the application's code. In response to notification of the error-inducing input, developers of the serverless application 106 may, for example, modify the source code of the serverless application 106 or take other actions to remediate the discovered software bug.

As shown in FIG. 1, a serverless monitor application 110 verifies that input data suspected to cause a runtime error during execution of a serverless application 106 actually causes an error by invoking a copy of the serverless application 108 based on the same input data. In some embodiments, in addition to testing suspected error-inducing input data 126 against a copy of a serverless application 108, a serverless monitor application 110 can test the input data against one or more variants of the serverless application. For example, a variant of the serverless application can comprise a copy of the serverless application with one or more patches or other modifications applied to the code, which can enable developers or other users to test whether particular patches or modifications are effective at properly handling identified error-inducing inputs.

Figure 2:
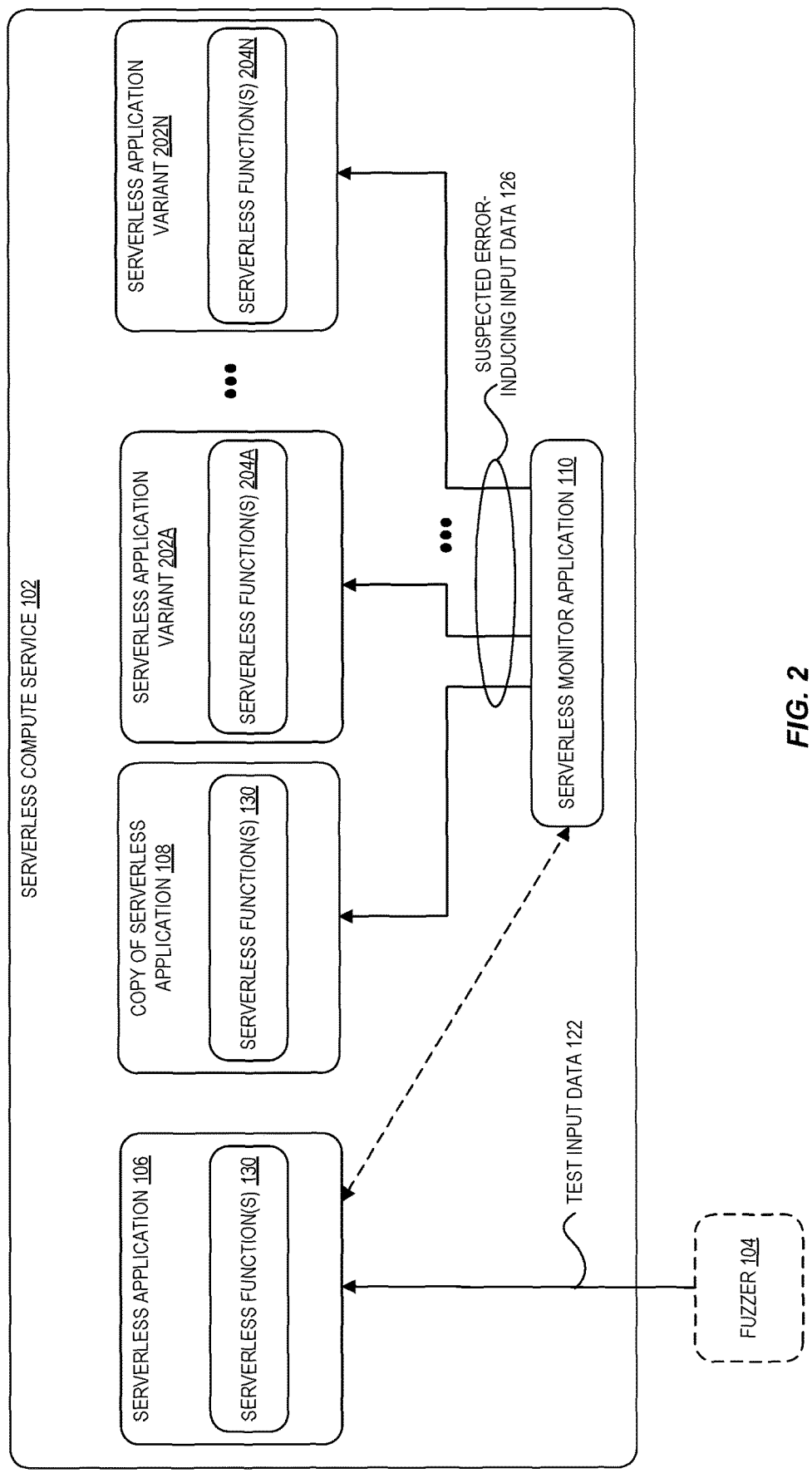
FIG. 2 is a diagram illustrating a fuzz testing environment including one or more variants of a serverless software application according to some embodiments.

FIG. 2 is a diagram illustrating a fuzz testing environment including one or more variants of a serverless software application. Similar to FIG. 1, a fuzzer 104 is shown generating test input data 122 that is used to invoke a serverless application 106, the execution of which is monitored by a serverless monitor application 110 (for example, by monitoring log data 128 generated by the serverless application 106 or performing other processes described herein). In response to identifying test input data suspected to cause a runtime error during execution of the serverless application 106, the serverless monitor application 110 verifies that the suspected error-inducing input data indeed causes error to occur by invoking and monitoring execution of a copy of the serverless application 108 based on the same input data.

In some embodiments, a serverless monitor application 110 also uses serverless application variants 202A-202N, comprising serverless function(s) 204A-204N, to perform other types of testing based on suspected error-inducing input data. For example, each of the serverless application variants 202A-202N may be configured with various code patches or other modifications, or are configured to receive the identified input data in different ways or perform different processing steps involving the input data, and so forth. In other examples, the serverless application variants 202A-202N can include essentially the same source code as the serverless application 106 and instead be used to concurrently test variants of suspected error-inducing input data 126. In general, because each execution of a serverless application is independent of other executions, many different types of testing can be performed based on suspected-error inducing input data 126.

Figure 3:
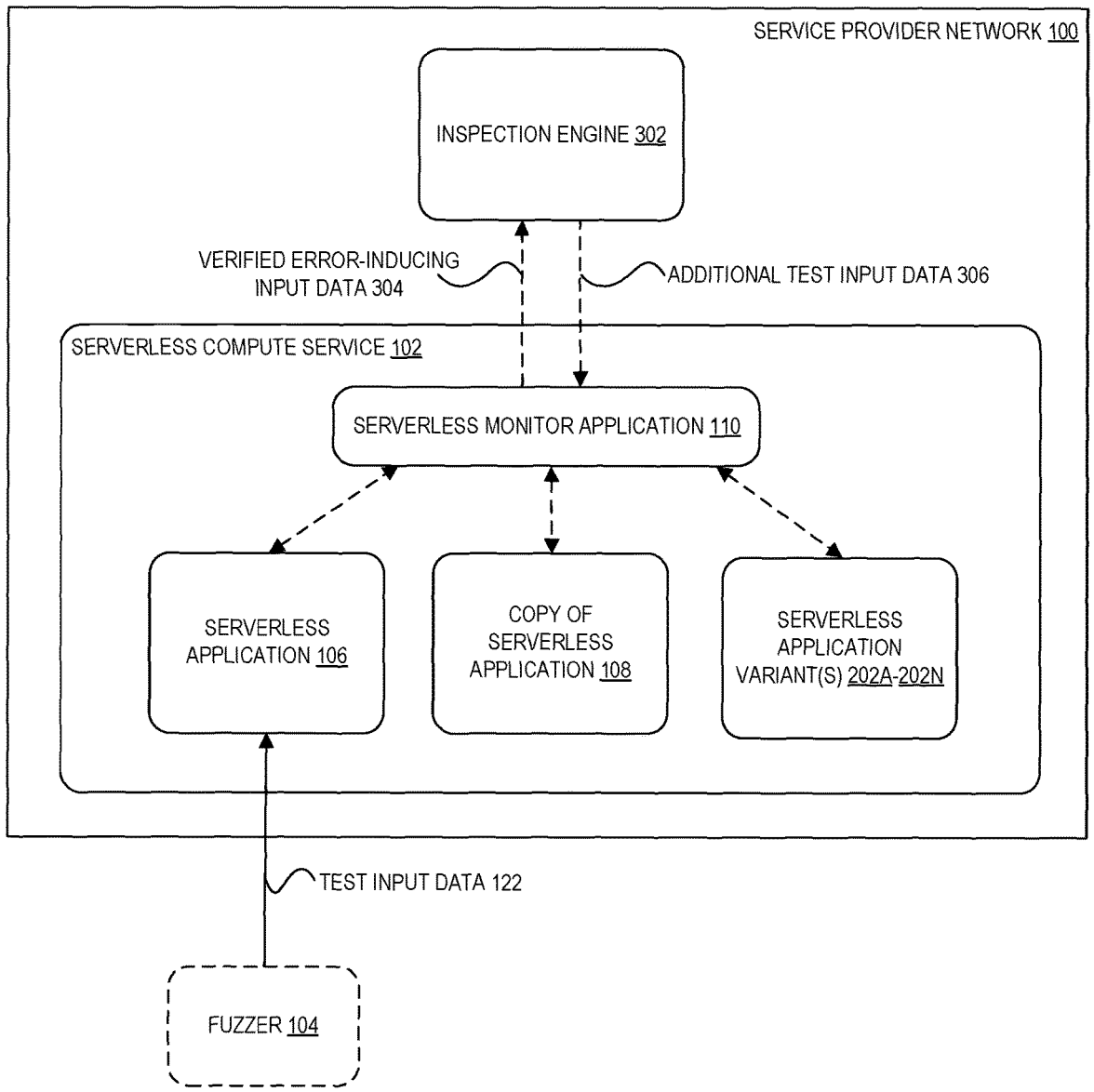
FIG. 3 is a diagram illustrating an environment for classifying inputs determined to cause runtime errors to occur during execution of serverless software applications according to some embodiments.

As indicated above, one operation that a serverless monitor application 110 may perform in response to verifying suspected error-inducing input data 126 is to send the input data to an inspection engine for classification and further analysis. FIG. 3 is a diagram illustrating an environment for collecting, classifying, and analyzing types of input data determined to cause runtime errors during execution of serverless software applications (and possibly during execution of server-based software applications as well).

As shown in FIG. 3, a fuzzer 104 and a serverless monitor application 110 test a serverless application 106 based on test input data 122 generated by the fuzzer 104, as described in reference to FIG. 1. In an embodiment, once test input data 122 is identified and verified to cause runtime errors, the serverless monitor application 110 sends the verified error-inducing input data 304 to an inspection engine 302. In an embodiment, an inspection engine 302 can be implemented by an application running on compute instances provided by the service provider network 100, by an application or service external to the service provider network 100, by a machine learning (ML) service of the service provider network 100 that enables users to build, train, and deploy machine learning models, or by other types of applications or combinations thereof. The inspection engine 302 can use ML or other techniques classify the verified error-inducing input data 304 based on properties of the input data itself, characteristics of the runtime error caused by the input data, properties of the serverless application 106 producing the error, and so forth. Example properties associated with the input data that can be used to classify the input include, but are not limited to, a type of the input data (for example, whether the input data was Unicode data, integer data, a file, and so forth), a size of the input data, metadata associated with the input data by the fuzzer 104 or other system components, and so forth. As another example, properties associated with the serverless application 106 that can be used to classify input data can include a type and version of a programming language and runtime used, size of the application, a type of operation being performed when the error occurred (for example, a disk read, a system call, a network operation), and so forth. In an embodiment, some or all of property information used to classify the input data may be inferred from the input data, the application, or both. Among other uses, the classification of input data known to cause errors can be analyzed to determine types of inputs that appear most troublesome for particular types of serverless applications. This information can be used, for example, to generate additional test input data that is similar to the error-inducing input data, to provide recommendations or to developers to avoid common issues, identify code patches known to correct particular types of issues, and so forth.

As indicated above, in one embodiment, the classification of verified error-inducing input data 304 can be used to provide feedback to the testing process in the form of additional test input data 306 that can be used to further test a serverless application 106 or variants of the application. As shown in FIG. 3, for example, based on receiving verified error-inducing input data 304, an inspection engine 302 can classify the data and identify other types of input data that is known to frequently cause errors for applications and/or input similar to the serverless application 106 and verified error-inducing input data 304. This additional test input data 306, for example, can be sent to a fuzzer 104 to enable to the fuzzer to generate additional similar test inputs to continue testing the application, and/or sent to a serverless monitor application 110 to enable the serverless monitor application to generate additional tests against copies and/or variants of the serverless application 106.

Figure 4:
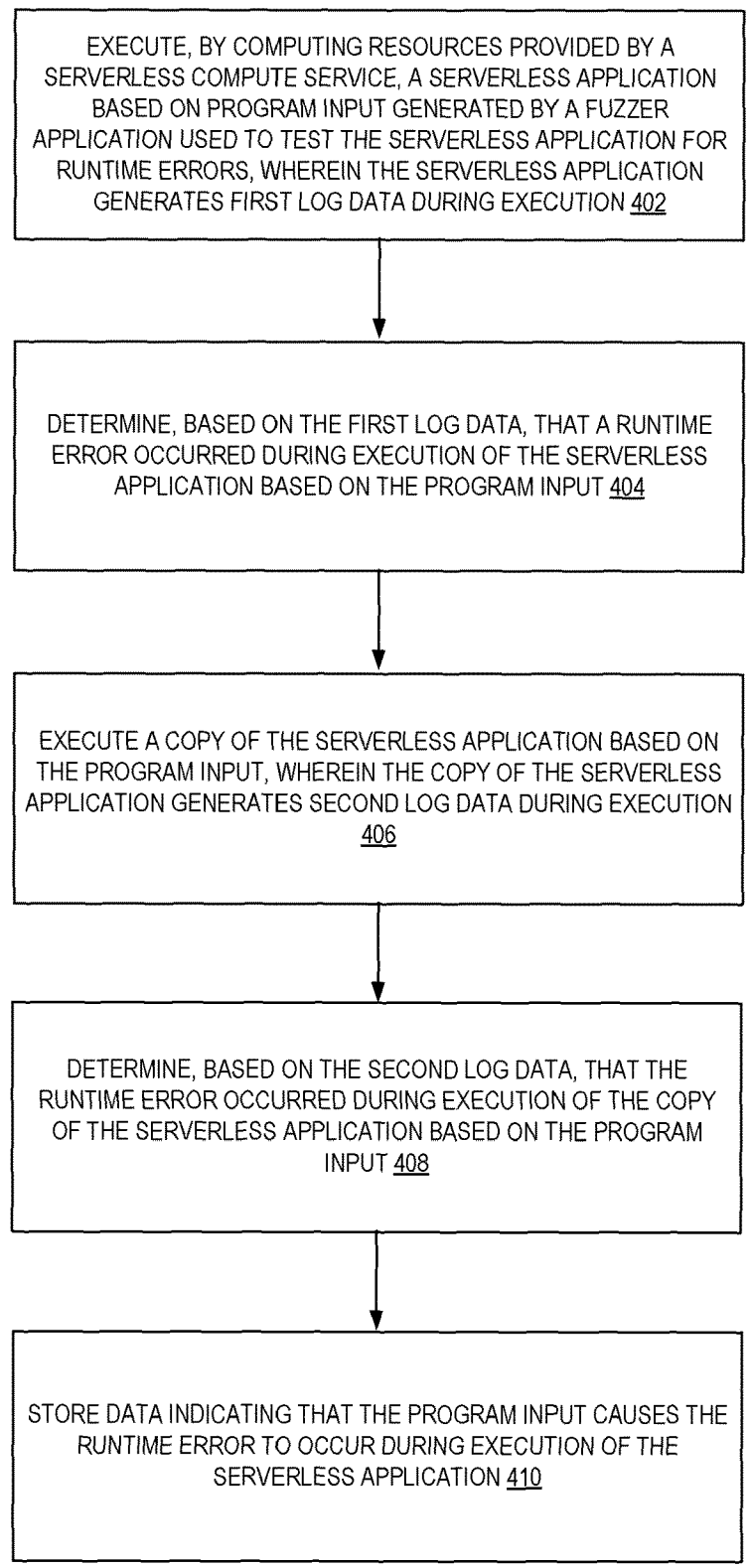
FIG. 4 is a flow diagram illustrating operations of a method for fuzz testing serverless software applications according to some embodiments.

FIG. 4 is a flow diagram illustrating operations 400 for fuzz testing serverless software applications according to some embodiments. Some or all of the operations 400 (or other processes described herein, or variations, and/or combinations thereof) are performed under the control of one or more computer systems configured with executable instructions and are implemented as code (for example, executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by a serverless compute service, a serverless monitor application, and possibly other components shown in the figures.

The operations 400 include, at block 402, executing, by computing resources provided by a serverless compute service, a serverless application based on program input generated by a fuzzer application used to test the serverless application for runtime errors. Referring to FIG. 1, for example, a serverless compute service 102 may execute a serverless application 106 based on program input (for example, test input data 122) generated by a fuzzer 104. In an embodiment, the serverless compute service automatically provisions and manages the computing resources used to execute the serverless application upon invocation of the serverless application. In an embodiment, the serverless application generates first log data during execution. For example, serverless application 106 may generate log data that is stored by a logging service 120 as log data 128.

In one embodiment, the fuzzer application generates a plurality of program inputs used to test the serverless application, wherein a separate invocation of the serverless application is executed based on each program input of the plurality of program inputs. For example, the fuzzer 104 in FIG. 1 can generate a plurality of program inputs using techniques described herein to test the serverless application 106. In an embodiment, a separate invocation of serverless application 106 is executed by the serverless compute service 102 based on each program input generated by the fuzzer 104.

The operations 400 further include, at block 404, determining, based on the first log data, that a runtime error occurred during execution of the serverless application based on the program input. In an embodiment, the runtime error includes one or more of: an application crash, failure of a built-in code assertion, a memory leak, a buffer overflow, and production of an incorrect or unexpected program output.

In one embodiment, the serverless monitor application determines that the runtime error occurred during execution of the serverless application by analyzing log data generated by the serverless application. In one embodiment, the serverless monitor application determines that the runtime error occurred during execution of the serverless application based on an event message generated by a logging service that analyzes log data generated by the serverless application. In FIG. 1, for example, a serverless monitor application 110 may determine that a runtime error occurred during execution of serverless application 106 based on log data 128 generated by the serverless application 106. The serverless monitor application 110 may determine that the runtime error occurred by analyzing the log data 128 directly, based on obtaining an event message from the logging service 120 indicating the error, or based on other monitoring techniques.

In an embodiment, the serverless monitor application identifies the program input that caused the runtime error to occur in log data generated by the serverless application. In one embodiment, a serverless monitor application identifies the program input causing the runtime error to occur during execution of the serverless application by correlating first log data generated by the serverless application with second log data generated by a service of a service provider network. In one embodiment, the serverless monitor application identifies the program input causing the runtime error to occur during execution of the serverless application by correlating timestamps associated with first log data generated by the serverless application with timestamps associated with second log data generated by one or more of: the fuzzer application, a service of the service provider network. For example, the serverless monitor application 110 of FIG. 1 may identify program input suspected to have caused the identified runtime error by identifying the program input in the log data 128 generated by the serverless application 106, by correlating log data 128 generated by the serverless application 106 with log data 128 generated by the fuzzer 104, one or more auxiliary services 112, or other system components.

In one embodiment, the program input causing the runtime error to occur during execution of the serverless application includes a plurality of program inputs, and wherein the runtime error occurred during execution of the serverless application based on processing the plurality of program inputs. For example, the serverless monitor application 110 in FIG. 1 may determine that a runtime error was caused by a particular sequence or combination or two or more of the test input data 122 items generated by the fuzzer 104.

The operations 400 further include, at block 406, executing a copy of the serverless application based on the program input, wherein the copy of the serverless application generates second log data during execution. For example, the serverless monitor application 110 may cause the serverless compute service 102 to execute the copy of the serverless application 108 based on the suspected error-inducing input data 126. In an embodiment, the copy of the serverless application 108 generates log data 128 during execution.

In one embodiment, a serverless monitor application causes execution of a plurality of serverless test applications based on the program input, each of the plurality of serverless test applications representing a variant of the serverless application. The serverless monitor application determines that the program input causes a runtime error to occur during execution of one or more of the plurality of serverless test applications and stores data indicating that the program input causes a runtime error to occur during execution of the one or more of the plurality of serverless test applications. As shown in FIG. 2, for example, a serverless monitor application 110 may cause execution of a copy of serverless application 108 in addition to one or more serverless application variants 202A-202N. In an embodiment, if the serverless monitor application 110 determines that the program input causes a runtime error to occur during execution of one or more of the serverless application variants 202A-202N, the serverless monitor application 110 stores data indicating that the program input causes a runtime error to occur during the execution.

The operations 400 further include, at block 408, determining, based on the second log data, that the runtime error occurred during execution of the copy of the serverless application based on the program input. For example, a serverless monitor application 110 may determine, based on log data 128 generated by the copy of the serverless application 108, that the runtime error occurred during execution of the copy of the serverless application 108, thereby verifying that the suspected error-inducing input data 126 indeed causes the error to occur.

The operations 400 further include, at block 410, storing data indicating that the program input causes the runtime error to occur during execution of the serverless application. For example, the serverless monitor application 110 may store data indicating that the program input causes the runtime error to occur during execution of the serverless application 106 in a data repository or other location.

In one embodiment, storing the data indicating that the program input causes the runtime error to occur includes sending the program input to a classifier that classifies the program input based on characteristics of one or more of: the program input and the serverless application. As shown in FIG. 3, for example, a serverless monitor application 110 may send the program input to an inspection engine 302 that classifies the program input based on various characteristics of the program input.

Figure 5:
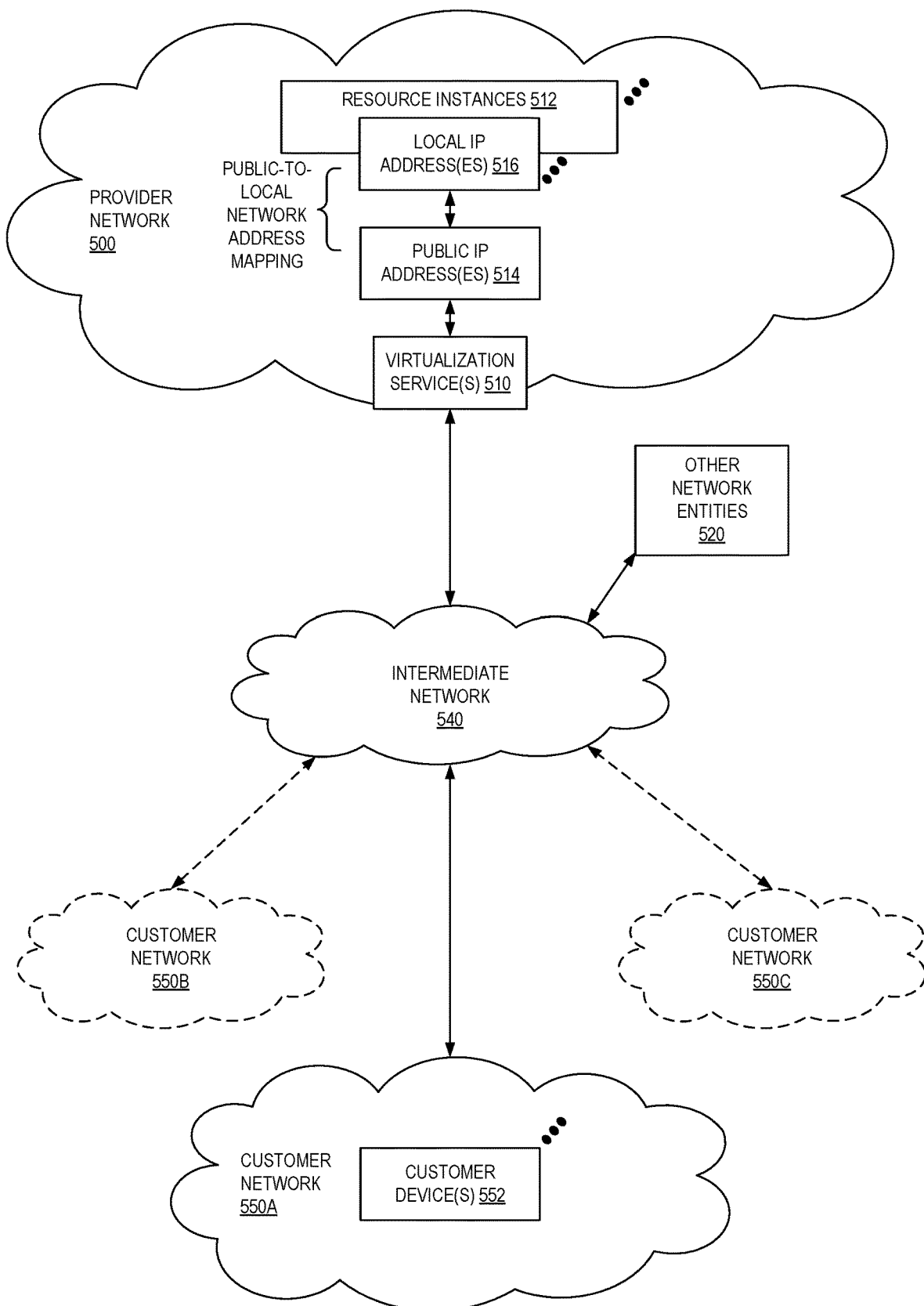
FIG. 5 illustrates an example provider network environment according to some embodiments.

FIG. 5 illustrates an example provider network (or "service provider system") environment according to some embodiments. A provider network 500 may provide resource virtualization to customers via one or more virtualization services 510 that allow customers to purchase, rent, or otherwise obtain instances 512 of virtualized resources, including but not limited to computation and storage resources, implemented on devices within the service provider network or networks in one or more data centers. Local IP addresses 516 may be associated with the resource instances 512; the local IP addresses are the internal network addresses of the resource instances 512 on the service provider network 500. In some embodiments, the service provider network 500 may also provide public IP addresses 514 and/or public IP address ranges (for example, Internet Protocol version 4 (IPv4) or Internet Protocol version 6 (IPv6) addresses) that customers may obtain from the service provider network 500.

Conventionally, the service provider network 500, via the virtualization services 510, may allow a customer of the service provider (for example, a customer that operates one or more client networks 550A-550C including one or more customer device(s) 552) to dynamically associate at least some public IP addresses 514 assigned or allocated to the customer with particular resource instances 512 assigned to the customer. The service provider network 500 may also allow the customer to remap a public IP address 514, previously mapped to one virtualized computing resource instance 512 allocated to the customer, to another virtualized computing resource instance 512 that is also allocated to the customer. Using the virtualized computing resource instances 512 and public IP addresses 514 provided by the service provider, a customer of the service provider such as the operator of customer network(s) 550A-550C may, for example, implement customer-specific applications and present the customer's applications on an intermediate network 540, such as the Internet. Other network entities 520 on the intermediate network 540 may then generate traffic to a destination public IP address 514 published by the customer network(s) 550A-550C; the traffic is routed to the service provider data center, and at the data center is routed, via a network substrate, to the local IP address 516 of the virtualized computing resource instance 512 currently mapped to the destination public IP address 514. Similarly, response traffic from the virtualized computing resource instance 512 may be routed via the network substrate back onto the intermediate network 540 to the source entity 520.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the service provider network. Network traffic originating outside the service provider network is not directly routed to local IP addresses; instead, the traffic uses public IP addresses that are mapped to the local IP addresses of the resource instances. The service provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the service provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the service provider network 500; a customer may then assign their allocated public IP addresses to particular resource instances allocated to the customer. These public IP addresses may be referred to as customer public IP addresses, or simply customer IP addresses. Instead of being assigned by the service provider network 500 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 6:
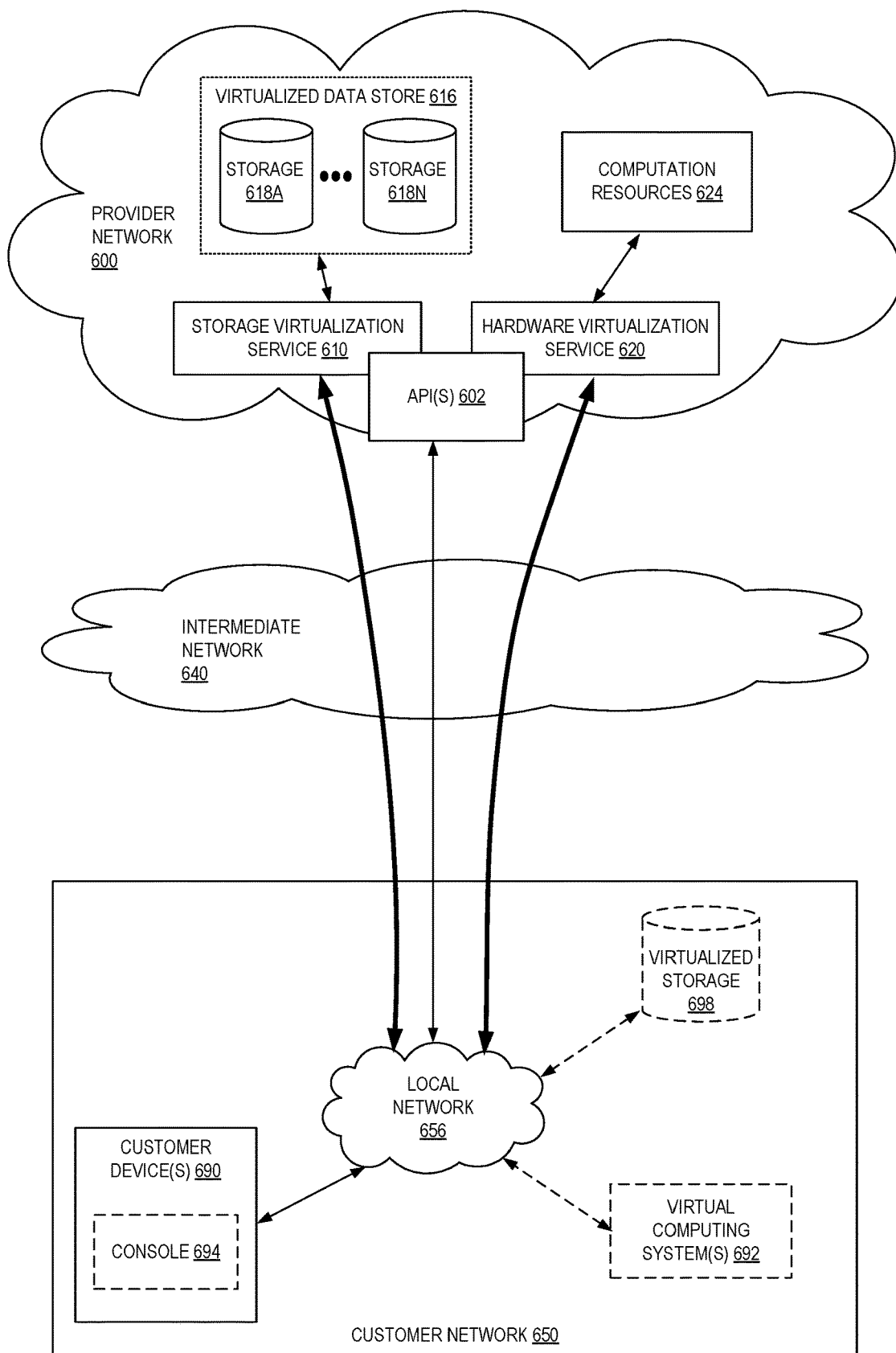
FIG. 6 is a block diagram of an example provider network that provides a storage virtualization service and a hardware virtualization service to customers according to some embodiments.

FIG. 6 is a block diagram of an example provider network that provides a storage virtualization service and a hardware virtualization service to customers, according to some embodiments. Hardware virtualization service 620 provides multiple computation resources 624 (for example, VMs) to customers. The computation resources 624 may, for example, be rented or leased to customers of the service provider network 600 (for example, to a customer that implements customer network 650). Each computation resource 624 may be provided with one or more local IP addresses. Provider network 600 may be configured to route packets from the local IP addresses of the computation resources 624 to public Internet destinations, and from public Internet sources to the local IP addresses of computation resources 624.

Provider network 600 may provide a customer network 650, for example coupled to intermediate network 640 via local network 656, the ability to implement virtual computing systems 692 via hardware virtualization service 620 coupled to intermediate network 640 and to provider network 600. In some embodiments, hardware virtualization service 620 may provide one or more APIs 602, for example a web services interface, via which a customer network 650 may access functionality provided by the hardware virtualization service 620, for example via a console 694 (for example, a web-based application, standalone application, mobile application, etc.). In some embodiments, at the service provider network 600, each virtual computing system 692 at customer network 650 may correspond to a computation resource 624 that is leased, rented, or otherwise provided to customer network 650.

From an instance of a virtual computing system 692 and/or another customer device 690 (for example, via console 694), the customer may access the functionality of storage virtualization service 610, for example via one or more APIs 602, to access data from and store data to storage resources 618A-618N of a virtual data store 616 provided by the service provider network 600. In some embodiments, a virtualized data store gateway (not shown) may be provided at the customer network 650 that may locally cache at least some data, for example frequently accessed or critical data, and that may communicate with virtualized data store service 610 via one or more communications channels to upload new or modified data from a local cache so that the primary store of data (virtualized data store 616) is maintained. In some embodiments, a user, via a virtual computing system 692 and/or on another customer device 690, may mount and access virtual data store 616 volumes, which appear to the user as local virtualized storage 698.

While not shown in FIG. 6, the virtualization service(s) may also be accessed from resource instances within the service provider network 600 via API(s) 602. For example, a customer, appliance service provider, or other entity may access a virtualization service from within a respective virtual network on the service provider network 600 via an API 602 to request allocation of one or more resource instances within the virtual network or within another virtual network.

Illustrative System

Figure 7:
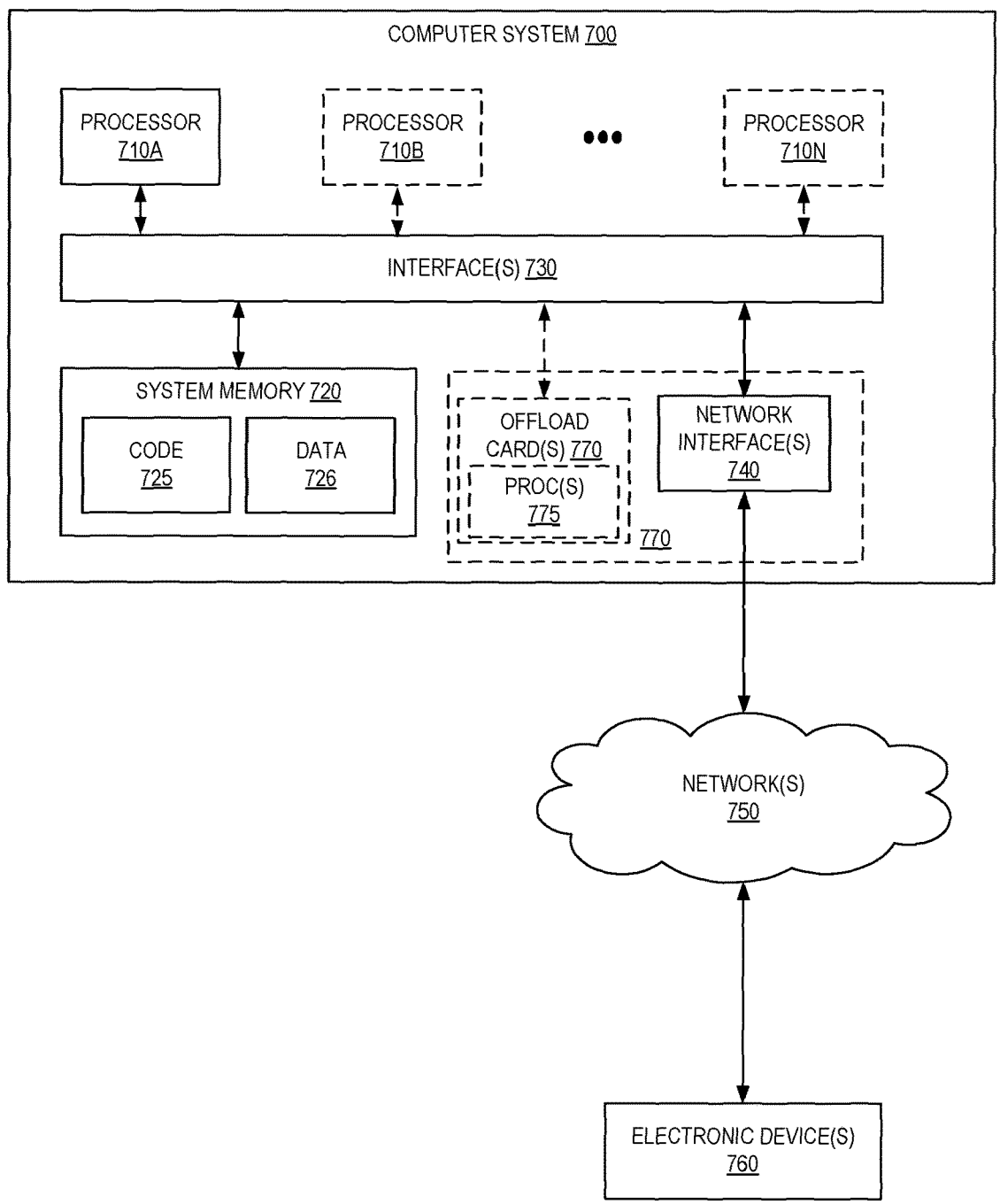
FIG. 7 is a block diagram illustrating an example computer system that may be used in some embodiments.

In some embodiments, a system that implements a portion or all of the techniques for fuzz testing serverless software applications implemented by a serverless compute service of a service provider network as described herein may include a general-purpose computer system that includes or is configured to access one or more computer-accessible media, such as computer system 700 illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (for example, two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 710 may commonly, but not necessarily, implement the same ISA.

System memory 720 may store instructions and data accessible by processor(s) 710. In various embodiments, system memory 720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 720 as code 725 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (for example, system memory 720) into a format suitable for use by another component (for example, processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices as illustrated in FIG. 1, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 700 includes one or more offload cards 770 (including one or more processors 775, and possibly including the one or more network interfaces 740) that are connected using an I/O interface 730 (for example, a bus implementing a version of the Peripheral Component Interconnect-Express (PCI-E) standard, or another interconnect such as a QuickPath interconnect (QPI) or UltraPath interconnect (UPI)). For example, in some embodiments the computer system 700 may act as a host electronic device (for example, operating as part of a hardware virtualization service) that hosts compute instances, and the one or more offload cards 770 execute a virtualization manager that can manage compute instances that execute on the host electronic device. As an example, in some embodiments the offload card(s) 770 can perform compute instance management operations such as pausing and/or un-pausing compute instances, launching and/or terminating compute instances, performing memory transfer/copying operations, etc. These management operations may, in some embodiments, be performed by the offload card(s) 770 in coordination with a hypervisor (for example, upon a request from a hypervisor) that is executed by the other processors 710A-710N of the computer system 700. However, in some embodiments the virtualization manager implemented by the offload card(s) 770 can accommodate requests from other entities (for example, from compute instances themselves), and may not coordinate with (or service) any separate hypervisor.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, for example, disk or DVD/CD coupled to computer system 700 via I/O interface 730. A non-transitory computer-accessible storage medium may also include any volatile or non-volatile media such as RAM (for example, SDRAM, double data rate (DDR) SDRAM, SRAM, etc.), read only memory (ROM), etc., that may be included in some embodiments of computer system 700 as system memory 720 or another type of memory.

Further, a computer-accessible medium may include transmission media or signals such as electrical, electromagnetic, or digital signals, conveyed via a communication medium such as a network and/or a wireless link, such as may be implemented via network interface 740.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (for example, large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (for example, 124A-124B) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (for example, A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   causing a plurality of first executions, by computing resources provided by a serverless compute service, of a serverless application based on a plurality of program inputs generated by a fuzzer application used to test the serverless application for runtime errors, wherein the serverless compute service automatically provisions and manages computing resources used to execute the serverless application upon invocation of the serverless application, and wherein the serverless application generates first log data during the plurality of first executions;
   determining, based on the first log data, that a type of runtime error occurred during a particular execution of the plurality of first executions of the serverless application based on a particular program input;
causing a second execution of the serverless application based on the particular program input, wherein the second execution of the serverless application occurs concurrently with at least one of the plurality of first executions of the serverless application, and wherein the second execution of the serverless application generates second log data during the second execution;
determining, based on the second log data, that the type of runtime error occurred during the second execution of the serverless application based on the particular program input; and
storing data indicating that the particular program input causes the type of runtime error to occur during execution of the serverless application.

2. The computer-implemented method of claim 1, wherein a separate execution of the serverless application is invoked based on each program input of the plurality of program inputs.

3. The computer-implemented method of claim 1, further comprising sending the particular program input to a classifier that classifies the particular program input based on characteristics of at least one of: the particular program input or the serverless application.

4. A computer-implemented method comprising:
receiving a plurality of program inputs from a fuzzer application that generates program inputs used to test software applications for runtime errors, wherein the plurality of program inputs cause a plurality of first executions of a serverless application executed by a serverless compute service, and wherein the serverless compute service automatically provisions and manages computing resources used to execute the serverless application upon invocation of the serverless application;
determining that a type of runtime error occurred during the plurality of first executions of the serverless application based on a particular program input of the plurality of program inputs;
causing a second execution of the serverless application based on the particular program input, wherein the second execution of the serverless application occurs concurrently with at least one of the plurality of first executions of the serverless application;
determining that the type of runtime error that occurred during the plurality of first executions of the serverless application also occurred during the second execution of the serverless application based on the particular program input; and
storing data indicating that the particular program input causes the type of runtime error to occur during execution of the serverless application.

5. The computer-implemented method of claim 4, wherein a separate execution of the serverless application is invoked based on each program input of the plurality of program inputs.

6. The computer-implemented method of claim 4, further comprising:
sending data identifying the particular program input to a classifier that classifies the particular program input based on characteristics of at least one of: the particular program input or the serverless application;
receiving, from the classifier, at least one additional program input based on the particular program input that causes the type of runtime error to occur; and
causing one or more third executions of the serverless application based on the at least one additional program input.

7. The computer-implemented method of claim 4, further comprising:
causing execution of a plurality of serverless test applications based on the particular program input, each of the plurality of serverless test applications representing a variant of the serverless application;
determining that the particular program input causes a type of runtime error to occur during execution of one or more of the plurality of serverless test applications; and
storing data indicating that the particular program input causes the type of runtime error to occur during execution of the one or more of the plurality of serverless test applications.

8. The computer-implemented method of claim 4, wherein a serverless monitor application determines that the type of runtime error occurred during the plurality of first executions of the serverless application by analyzing log data generated by the serverless application.

9. The computer-implemented method of claim 4, wherein a serverless monitor application determines that the type of runtime error occurred during the plurality of first executions of the serverless application based on an event message generated by a logging service that analyzes log data generated by the serverless application.

10. The computer-implemented method of claim 4, further comprising identifying the particular program input that caused the type of runtime error to occur in log data generated by the serverless application.

11. The computer-implemented method of claim 4, wherein a serverless monitor application identifies the particular program input causing the type of runtime error to occur during the plurality of first executions of the serverless application by correlating first log data generated by the serverless application with second log data generated by a service of a service provider network.

12. The computer-implemented method of claim 4, wherein a serverless monitor application identifies the particular program input causing the type of runtime error to occur during the plurality of first executions of the serverless application by correlating timestamps associated with first log data generated by the serverless application with timestamps associated with second log data generated by at least one of: the fuzzer application, or a service of a service provider network.

13. The computer-implemented method of claim 4, wherein the particular program input includes a plurality of program inputs, and wherein the type of runtime error occurred during the plurality of first executions of the serverless application based on processing the plurality of program inputs.

14. The computer-implemented method of claim 4, wherein the type of runtime error includes one or more of: an application crash, failure of a built-in code assertion, a memory leak, a buffer overflow, or production of an incorrect or unexpected program output.

15. A system comprising:
a first one or more electronic devices comprising a processor to implement a fuzzer application that generates a plurality of program inputs used to test a serverless application implemented by a serverless compute service for runtime errors, the fuzzer application including instructions that, upon execution, cause the fuzzer application to generate the plurality of program inputs, each program input causing a separate invocation of the serverless application; and a second one or more electronic devices to implement a monitor application, the monitor application including instructions that upon execution cause the monitor application to:

determine, based on first log data generated by the serverless application, that a type of runtime error occurred during a plurality of first executions of the serverless application based on a particular program input;

cause a second execution of the serverless application based on the particular program input, wherein the second execution of the serverless application occurs concurrently with at least one of the plurality of first executions of the serverless application;

determine, based on second log data generated by the second execution of the serverless application, that the type of runtime error occurred during the second execution of the serverless application based on the particular program input; and store data indicating that the particular program input causes the type of runtime error to occur during execution of the serverless application.

16. The system of claim 15, further comprising a classifier implemented by a third one or more electronic devices, the classifier including instructions that upon execution cause the classifier to:

receive data identifying the particular program input; and classify the particular program input based on characteristics of at least one of: the particular program input or the serverless application.

17. The system of claim 15, wherein a serverless monitor application determines that the type of runtime error occurred during the plurality of first executions of the serverless application by analyzing log data generated by the serverless application.

18. The system of claim 15, wherein a serverless monitor application determines that the type of runtime error occurred during the plurality of first executions of the serverless application based on an event message generated by a logging service that analyzes log data generated by the serverless application.

19. The system of claim 15, wherein a serverless monitor application identifies the particular program input that caused the type of runtime error to occur in log data generated by the serverless application.

20. The system of claim 15, wherein the type of runtime error includes one or more of: an application crash, failure of a built-in code assertion, a memory leak, a buffer overflow, and production of an incorrect or unexpected program output.

\* \* \* \* \*